US009221460B2

(12) United States Patent
Bichler et al.

(10) Patent No.: US 9,221,460 B2
(45) Date of Patent: Dec. 29, 2015

(54) DRIVETRAIN

(75) Inventors: Markus Bichler, Neuseiersberg (AT);
Werner Eisenhauer, Gössendorf (AT);
Konrad Gagla, St. Margarethen/Raab (AT)

(73) Assignee: Magna Pawertrain AG & Co KG, Lannach (AT)

( * ) Notice: Subject to any disclaimer, the term of this patent is extended or adjusted under 35 U.S.C. 154(b) by 0 days.

(21) Appl. No.: 14/128,697

(22) PCT Filed: Jun. 26, 2012

(86) PCT No.: PCT/EP2012/062369
§ 371 (c)(1),
(2), (4) Date: Mar. 18, 2014

(87) PCT Pub. No.: WO2013/004552
PCT Pub. Date: Jan. 10, 2013

(65) Prior Publication Data
US 2015/0038290 A1    Feb. 5, 2015

(30) Foreign Application Priority Data
Jul. 2, 2011    (DE) .......................... 10 2011 106 399

(51) Int. Cl.
*B60K 6/38*    (2007.10)
*B60W 20/00*    (2006.01)
(Continued)

(52) U.S. Cl.
CPC .................. *B60W 20/50* (2013.01); *B60K 6/48* (2013.01); *B60L 7/18* (2013.01); *B60L 11/14* (2013.01); *B60L 15/2009* (2013.01); *B60W 10/02* (2013.01); *B60W 10/06* (2013.01); *B60W 10/08* (2013.01); *F16D 21/08* (2013.01); *F16D 25/087* (2013.01); *B60K 2006/4825* (2013.01); *B60L 2240/12* (2013.01); *B60L 2240/421* (2013.01);
(Continued)

(58) Field of Classification Search
CPC .......................... B60K 6/48; B60K 2006/4825
USPC ............................... 180/65.25, 65.225, 65.23
See application file for complete search history.

(56) References Cited

U.S. PATENT DOCUMENTS 5,845,731 A * 12/1998 Buglione et al. ........... 180/65.23
6,668,953 B1 * 12/2003 Reik et al. .................... 180/53.8
(Continued)

FOREIGN PATENT DOCUMENTS

DE    3411091 A1    5/1985
DE    3737192 A1    7/1988
(Continued)

OTHER PUBLICATIONS

International Search Report mailed Oct. 17, 2012 (PCT/EP2012/062369).

*Primary Examiner* — Jeffrey J Restifo
(74) *Attorney, Agent, or Firm* — Dickinson Wright PLLC

(57) ABSTRACT

The present invention relates to a drivetrain of a motor vehicle, having an internal combustion engine, having an electric machine, having a transmission unit, in particular a manual transmission, and having a clutch unit. The clutch unit comprises a first clutch actuable by a driver of the motor vehicle and a second clutch automatically actuable by a control unit. The electric machine can be coupled in terms of drive to the transmission unit by means of the first clutch and the internal combustion engine can be coupled in terms of drive to the electric machine by means of the second clutch.

25 Claims, 3 Drawing Sheets

(51) Int. Cl.
  *B60K 6/48* (2007.10)
  *F16D 21/08* (2006.01)
  *F16D 25/08* (2006.01)
  *B60W 10/02* (2006.01)
  *B60W 10/06* (2006.01)
  *B60W 10/08* (2006.01)
  *B60L 7/18* (2006.01)
  *B60L 11/14* (2006.01)
  *B60L 15/20* (2006.01)
  *F16F 15/134* (2006.01)

(52) U.S. Cl.
  CPC ...... *B60L 2240/423* (2013.01); *B60L 2270/145* (2013.01); *F16F 15/134* (2013.01); *Y02T 10/6221* (2013.01); *Y02T 10/6252* (2013.01); *Y10S 903/902* (2013.01)

(56) References Cited

U.S. PATENT DOCUMENTS

| | | | |
|---|---|---|---|
| 8,290,654 B2* | 10/2012 | Becker et al. | 701/22 |
| 8,307,924 B2* | 11/2012 | Wang et al. | 180/65.23 |
| 8,528,674 B2* | 9/2013 | Kraft et al. | 180/53.8 |
| 8,942,876 B2* | 1/2015 | Dai et al. | 701/22 |
| 9,014,896 B2* | 4/2015 | Arita | 701/22 |
| 2004/0157704 A1* | 8/2004 | Stork et al. | 477/166 |
| 2012/0118695 A1* | 5/2012 | Kawashima et al. | 192/48.609 |
| 2013/0160731 A1* | 6/2013 | Poeltenstein et al. | 123/179.1 |
| 2013/0337972 A1* | 12/2013 | Lee et al. | 477/5 |
| 2014/0228167 A1* | 8/2014 | Frank et al. | 477/5 |
| 2014/0228168 A1* | 8/2014 | Kaufman et al. | 477/5 |
| 2014/0311285 A1* | 10/2014 | Kaltenbach et al. | 74/661 |
| 2014/0365057 A1* | 12/2014 | Arita et al. | 701/22 |
| 2015/0032358 A1* | 1/2015 | Amemiya | 701/104 |
| 2015/0038290 A1* | 2/2015 | Bichler et al. | 477/5 |
| 2015/0039170 A1* | 2/2015 | Isomura et al. | 701/22 |
| 2015/0046006 A1* | 2/2015 | Shimoyama et al. | 701/22 |
| 2015/0051766 A1* | 2/2015 | Matsui et al. | 701/22 |
| 2015/0051775 A1* | 2/2015 | Gotoh et al. | 701/22 |

FOREIGN PATENT DOCUMENTS

| | | |
|---|---|---|
| DE | 4434019 A1 | 4/1995 |
| DE | 19950081 A1 | 5/2000 |
| DE | 10025853 A1 | 4/2001 |

\* cited by examiner

DRIVETRAIN

CROSS-REFERENCE TO RELATED APPLICATIONS

This application is a U.S. National Phase of International Application No. PCT/EP2012/062369 filed Jun. 26, 2012 which claims priority to German Application No. DE102011106399.8 filed on Jul. 2, 2011. The entire disclosure of each of the above applications is incorporated herein by reference.

TECHNICAL FIELD

The present invention relates to a drivetrain of a motor vehicle having an internal combustion engine, an electric machine and a transmission unit, in particular a manual transmission.

BACKGROUND

A wide variety of types of hybrid architectures of a drivetrain of a motor vehicle are basically known which combine an internal combustion engine and an electric machine in order to enable the motor vehicle to be driven efficiently. In general, a distinction is made between three different stages of hybridization, which differ in particular with regard to the contribution made by the electric machine to the drive torque.

In the case of so-called micro-hybrid vehicles, it is generally the case that an electric machine is provided for an automatic start-stop facility and for brake energy recovery for the purpose of charging a relatively small starter battery. In this case, the electric machine is normally not used for driving the vehicle.

By contrast, in the case of so-called mild hybrids, the electric machine provides assistance to the internal combustion engine in order to realize increased performance. Furthermore, the energy that arises during a braking process can, with suitable configuration of the drivetrain, be at least partially recovered in a generator mode of the electric machine.

By contrast to the hybridization variants described above, full hybrid vehicles can be driven entirely by the electric machine over relatively long periods of time. In the case of such vehicles, it may for example be provided that the internal combustion engine merely drives an electrical generator, the electrical generator supplying electrical energy to the electric machine in order to generate a drive torque and/or charging a battery. It is therefore possible for use to be made of an internal combustion engine of smaller dimensions than in motor vehicles with similar performance characteristics. Moreover, the internal combustion engine can be operated in an efficient power range, because power peaks can generally be covered by extracting energy from the battery.

Full hybrid architectures are also known in which the drive torque is provided either by the electric machine or by the internal combustion engine depending on demand. The electric machine and the internal combustion engine are in this case selectively coupled to or separated from the drivetrain by means of suitable clutches.

SUMMARY

It is an object of the present invention to specify a drivetrain which exhibits the functionalities of a micro-hybrid or mild hybrid and which also permits purely electric driving of the vehicle at least intermittently. At the same time, it should be possible for the components required for the stated functionalities to be integrated in a simple manner into a drivetrain of a conventional motor vehicle driven purely by internal combustion engine.

This object is achieved by means of a drivetrain having an internal combustion engine, an electric machine, a transmission unit, in particular a manual transmission, and a clutch unit which comprises a first clutch actuable by a driver of the motor vehicle and a second clutch automatically actuable by a control unit, wherein the electric machine can be coupled in terms of drive to the transmission unit by means of the first clutch and wherein the internal combustion engine can be coupled in terms of drive to the electric machine by means of the second clutch.

In accordance with the invention, the drivetrain has a clutch unit which comprises a first clutch actuable by a driver of the motor vehicle and a second clutch automatically actuable by a control unit. The electric machine can be coupled in terms of drive to the transmission unit by means of the first clutch and the internal combustion engine can be coupled in terms of drive to the electric machine by means of the second clutch.

In other words, it is provided in accordance with the invention that the clutch unit, which is in particular in the form of a module for the hybridization of conventional drivetrain architectures, comprises two clutches that can be actuated independently of one another, wherein the first clutch is controlled by the driver and allows the electric machine to be coupled to the transmission unit. By contrast, the second clutch is automated and can be actuated by a control unit such that coupling can be established as required between the internal combustion engine and the electric machine automatically—that is to say without any activity on the part of the driver—as a function of the driving situation.

Such a configuration of the drivetrain permits simple integration of the electric machine into the drivetrain, wherein only minor modifications to the existing drivetrain architecture are required. Specifically, in addition to the electric machine, all that ultimately needs to be provided is the clutch unit, which supplements or even replaces the starting element provided in any case in conventional drivetrains. Cumbersome modification of the internal combustion engine or of the transmission unit is generally not required, because the clutch unit can for example be integrated into an already existing clutch housing bell.

Further embodiments of the invention are specified in the description, in the claims and in the appended drawings.

In one embodiment, an axis of rotation of an output shaft of the internal combustion engine and an axis of rotation of a rotor of the electric machine are arranged offset with respect to one another in parallel or are arranged coaxially, so as to allow for the respectively applicable geometric boundary conditions of the available installation space and/or the expected performance requirements.

Compact and reliable actuation of the first clutch and of the second clutch can be provided by means of a double central clutch operator which is arranged coaxially with respect to the clutches and which can in particular be hydraulically or electromechanically actuated.

A structurally simple design of the drivetrain in accordance with the invention is obtained if the first clutch and the second clutch are dry-running clutches. Cumbersome measures for sealing the clutches are eliminated in the case of this embodiment.

It may be provided that the clutch unit comprises a carrier disk which is a functional component of the first and of the second clutch. This permits, in particular, a compact design. Furthermore, through the use of a carrier disk assigned to both clutches, the tolerance chains of the clutch unit are optimized.

In particular, the carrier disk is arranged in an axial direction between the first and the second clutch.

The first and the second clutch may have at least one clutch disk, which clutch disks can be pressed independently of one another directly or indirectly against the carrier disk or against a projection which is connected rotationally conjointly to the carrier disk, in order to realize frictional engagement between the respective clutch disk and the carrier disk.

To be able to integrate the clutch unit into conventional drivetrain architectures in a simple and reliable manner, the carrier disk may be mounted in an axially fixed and rotatable manner on an output shaft of the internal combustion engine or on an input shaft of the transmission unit or on a projection which is connected rotationally conjointly to the output shaft or to the input shaft.

In particular, the carrier disk is permanently coupled in terms of drive to the electric machine. For example, the carrier disk is coupled to the electric machine via a belt drive. Alternatively, a rotor of the electric machine may be fastened to the carrier disk—directly or indirectly via a projection which is connected rotationally conjointly to the carrier disk.

A torsional vibration damper may be provided for damping of irregularities of the rotational movement generated by the internal combustion engine, wherein the second clutch is coupled to the internal combustion engine via the torsional vibration damper. In this embodiment, a primary side of the torsional vibration damper is connected rotationally conjointly to an output shaft of the internal combustion engine, whereas a secondary side of the torsional vibration damper is coupled rotationally conjointly to an input element of the second clutch. The secondary side of the torsional vibration damper and the input element of the second clutch may be fastened rotationally conjointly to a hub which is mounted rotatably on the output shaft of the internal combustion engine or on a projection which is connected rotationally conjointly to the output shaft.

Instead of a separate torsional vibration damper, a rotationally elastic damping device may be provided which is integrated into the input element in order to be able to absorb the rotational vibrations generated by the internal combustion engine. The input element, in particular a clutch disk, which has the damping device is in this embodiment coupled to a flywheel mass which is connected rotationally conjointly to an output shaft of the internal combustion engine.

To make the clutch unit more compact, the damping device may be arranged radially within the carrier disk or a projection which is connected rotationally conjointly to the carrier disk. The flywheel mass may also be arranged, at least in sections, in the interior of the carrier disk or of a projection which is connected rotationally conjointly to the carrier disk.

In one embodiment of the present invention, the electric machine is a disk motor. An advantage of this embodiment consists in that the rotor of a motor of said type can be of lightweight construction and thus has a low moment of inertia. For this reason, disk motors can be accelerated and braked relatively quickly, and exhibit very smooth running even at low rotational speeds.

To permit recuperation—that is to say the recovery of electrical energy during a braking process of the motor vehicle—the electric machine is designed such that it can be operated both as a motor and also as a generator.

DRAWINGS

The invention will be explained below, merely by way of example, on the basis of advantageous embodiments and with reference to the appended drawings, in which:

FIG. 1 schematically illustrates a first embodiment of the drivetrain in accordance with the invention;

FIG. 2 schematically illustrates a second embodiment of the drivetrain in accordance with the invention;

DESCRIPTION

Figure 1:
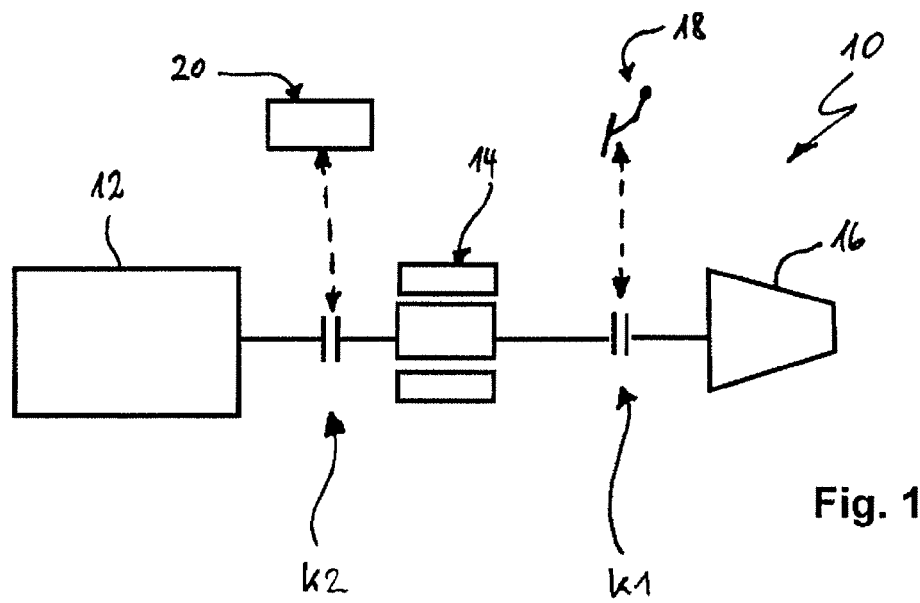

FIG. 1 illustrates a drivetrain 10 which comprises an internal combustion engine 12, an electric motor 14 and a manual transmission 16. The drivetrain 10 also comprises a clutch K1 which is actuated by a driver of the motor vehicle and which couples the transmission 16 to the electric motor 14. Said clutch K1 is operated by the driver for example by means of a clutch pedal 18, in particular in starting situations and gearshift situations. Also provided is a clutch K2 which selectively couples the engine 12 and motor 14. Said clutch K2 is actuated by a control unit 20 in order to be able to couple the internal combustion engine 12 in terms of drive to the electric motor 14 as required, without activity on the part of the driver.

Figure 2:
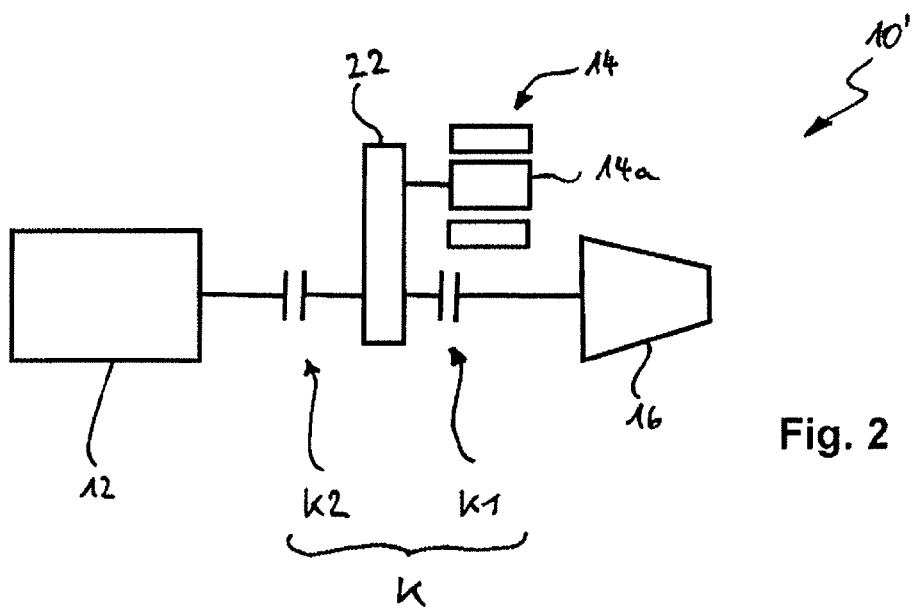

An alternative embodiment 10' of the drivetrain is illustrated in FIG. 2, wherein for clarity, the pedal 18 and the control unit 20 are not illustrated. In the drivetrain 10', the electric motor 14 is arranged not coaxially with respect to the internal combustion engine 12 but rather so as to be offset with respect thereto in parallel. The electric motor 14 is therefore incorporated into the drivetrain 10' via a cross-drive module 22. A more compact design of the drivetrain 10' in the axial direction is obtained in this way. With suitable selection of the geometric relationships, the electric machine 14 can be fastened to a housing of a clutch module K formed by the clutches K1, K2 or to other components of the drivetrain 10'. The cross-drive module 22, which may comprise a belt drive, a chain drive or a gearwheel set, also makes it possible to realize a transmission ratio in order to make it possible for a drive torque generated by the electric motor 14 to be fed into the drivetrain 10' in a suitable rotational speed range. The above-described configuration is suitable in particular for the use of relatively high-speed electric machines.

Even though the drivetrains 10, 10' differ with regard to the arrangement of the electric motor 14 relative to the other components of the respective drivetrain 10, 10', the mode of operation thereof is however fundamentally the same.

When the clutch K2 is open, purely electric starting of the vehicle can be realized if the clutch K1 is closed. Furthermore—in particular when the clutch K1 is open—it is possible, with the clutch K2 closed, for the internal combustion engine 12 to be started by means of the electric motor 14, for example in order to realize start-stop functionality controlled by the control unit 20. At relatively high speeds, it may be advantageous for only the internal combustion engine 12 to be actively driven in order to provide drive torque for the propulsion of the vehicle. It is duly the case here that a rotor 14a of the electric motor 14 is driven concomitantly. However, if the rotor 14a is configured suitably and has a relatively low moment of inertia, such as is the case with a disk rotor of a disk motor, this does not lead to significant efficiency losses. If energy is supplied to the electric motor 14 in this configuration, said electric motor assists the internal combustion engine 12, whereby it is for example possible for peaks in power demand to be dealt with efficiently.

When required, the electric motor 14 can also be used as a generator, for example during a braking process. In this state, the clutch K1 is closed, whereas the clutch K2 is open. A situation in which drag losses are generated in the internal combustion engine 12 is thus prevented. The torque acting in the drivetrain can thus be supplied substantially entirely to the electric motor 14 that is being operated in the generator mode, which electric motor converts said torque into electrical energy and thereby brakes the vehicle. In the converse state, that is to say when the clutch K2 is closed and the clutch K1 is open, the internal combustion engine 12 can be utilized, with the electric motor 14 in the generator mode, to charge a battery. It is self-evident that charging of the energy store is fundamentally also possible with the clutch K1 closed. In this situation, the internal combustion engine 12 then drives both the electric motor 14, which is functioning as a generator, and also the vehicle.

Figure 3:
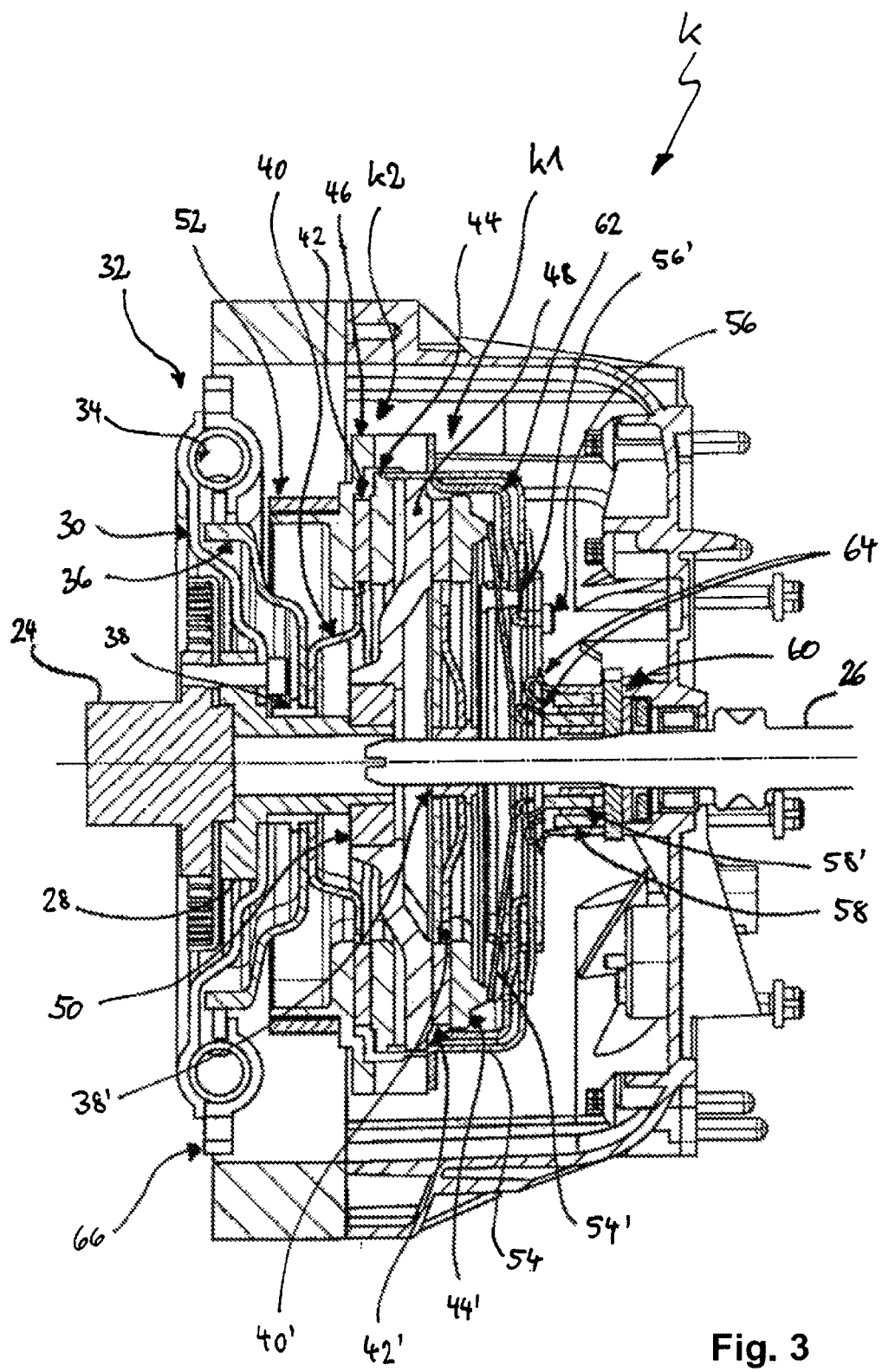
FIG. 3 illustrates a first embodiment of the clutch unit.

FIG. 3 illustrates a section through an embodiment of the clutch module K which is connected at the input side to an output shaft 24 of the internal combustion engine 12. At the output side, the clutch module K is connected to an input shaft 26 of the manual transmission 16.

The engine output shaft 24 is connected rotationally conjointly to an intermediate shaft 28 and to a primary flywheel mass 30 of a dual-mass flywheel 32 for rotary vibration damping. The primary flywheel mass 30 is coupled in a rotationally elastic manner to a secondary flywheel mass 36 via damping elements 34—for example springs. The secondary flywheel mass 36 is connected rotationally conjointly to a hub 38 which, in turn, is mounted rotatably on the intermediate shaft 28. The hub 38 is furthermore connected rotationally conjointly to a clutch disk 40 which is a constituent part of the clutch K2. In a radially outer region, the clutch disk 40 is provided with a friction lining 42 which can be pressed by means of a thrust plate 44 against an axially fixedly arranged carrier projection 46.

The carrier projection 46 is coupled to or formed integrally with a carrier disk 48 which, by means of a fixed bearing 50, is mounted in a rotatable and axially fixed manner on the intermediate shaft 28. The carrier projection 46 also has a toothing 52 which is engaged into by a belt (not illustrated) which, in turn, produces a drive connection to the electric motor 12. It is self-evident that, instead of the belt drive, use may also be made of other coupling means by which an electric motor 12, which is arranged offset with respect to the shafts 24, 26 in parallel (see FIG. 2), can be incorporated into the drivetrain 10'. Instead of the toothing 52, it is also possible for a disk-shaped rotor of a disk motor to be connected rotationally conjointly to the carrier projection 46 or to the carrier disk 48 in order to realize a permanent coupling between said components and the electric motor 12.

The components 40, 42, 44, 46 and 48 ultimately form the clutch K2. The latter can be actuated by means of an actuating lever 54 which acts on the thrust plate 44 and which is guided through a corresponding opening of the carrier disk 48 and which is mounted on a bearing pin 56. The lever 54 may basically be capable of being actively driven in both of its directions of movement. The lever 54 is however preferably spring-preloaded such that, in its initial position, the lever 54, via the thrust plate 44, presses the friction lining 42 against the carrier projection 46 in order to produce frictional engagement between said components. In this way, the output shaft 24 of the internal combustion engine 12 is coupled to the electric motor 14. Owing to the mounting of the lever 54 on the pin 56, an actuating piston 58 which is in contact with the lever 54 must—in the illustration in FIG. 3—be moved to the left in order to release the thrust plate 44 from the friction lining 42 and thus release the clutch disk 40 from the carrier projection 46. The clutch K2 is hereby opened.

The actuating piston 58 is a constituent part of a hydraulically actuable double central clutch operator 60. Said actuating piston is for example connected to a "power pack", which functions as a control unit 20, and is actuated automatically.

Aside from the actuating piston 58, the double central clutch operator 60 comprises a further actuating piston 58' which is connected to a thrust plate 44' of the clutch K1 via an actuating lever 54'. When the piston 58' moves to the right in FIG. 3—in particular passively owing to a corresponding spring preload of the lever 54'—this has the effect that the lever 54' mounted on a pin 56' presses the thrust plate 44' against a friction lining 42' of a clutch disk 40', and the friction lining 42' is hereby pressed against the carrier disk 48. In this way, frictional engagement is produced between said components, which has the effect that the carrier disk 48—and thus the electric motor 12—is coupled to the transmission input shaft 26, because the clutch disk 40' is connected rotationally conjointly to the transmission input shaft 26 via a hub 38'. By contrast, if, in order to open the clutch K1, the piston 58' is moved to the left in FIG. 3—in particular if the driver actuates the pedal 18 (FIG. 1)—this has the effect that the friction lining 42' is released from the carrier disk 48, that is to say the transmission input shaft 26 is decoupled from the electric motor 12.

In designing the actuator means for the clutches K1, K2, it must be ensured that the pins 56, 56' are arranged on a carrier plate 62 which is connected rotationally conjointly to the carrier disk 48. That is to say, said components and also the levers 54, 54' rotate together with the carrier disk 48. Since the double central clutch operator 60 is arranged so as to be rotationally fixed, bearing elements 64 are provided between the levers 54, 54' and the pistons 58 and 58' respectively, which bearing elements firstly ensure decoupling of said components with regard to relative rotational movements but secondly also provide axial coupling, such that axial movements of the pistons 58, 58' are transmitted to the levers 54 and 54' respectively.

The advantage of the above-described embodiment of the clutch module K consists in that it can be installed in a simple manner between the output shaft 24 of the internal combustion engine 12 and the input shaft 26 of the manual transmission 16 instead of a conventional dual-mass flywheel and a starting element, without comprehensive structural modifications to the conventionally used components being required. Moreover, the dual-mass flywheel 32 may also substantially correspond to the conventional design. For example, said dual-mass flywheel may be provided with a starter ring 66 which serves for the starting of the internal combustion engine 12 by means of a separate starter motor (not illustrated).

Since the carrier disk 48 is arranged in the axial direction between the first clutch K1 and the second clutch K2 with the respective components, and since the carrier disk 48 is mounted in an axially fixed manner on the intermediate shaft 28 by means of a fixed bearing 50, there are advantageously short tolerance chains in the axial direction on both sides of the carrier disk 48.

Figure 4:
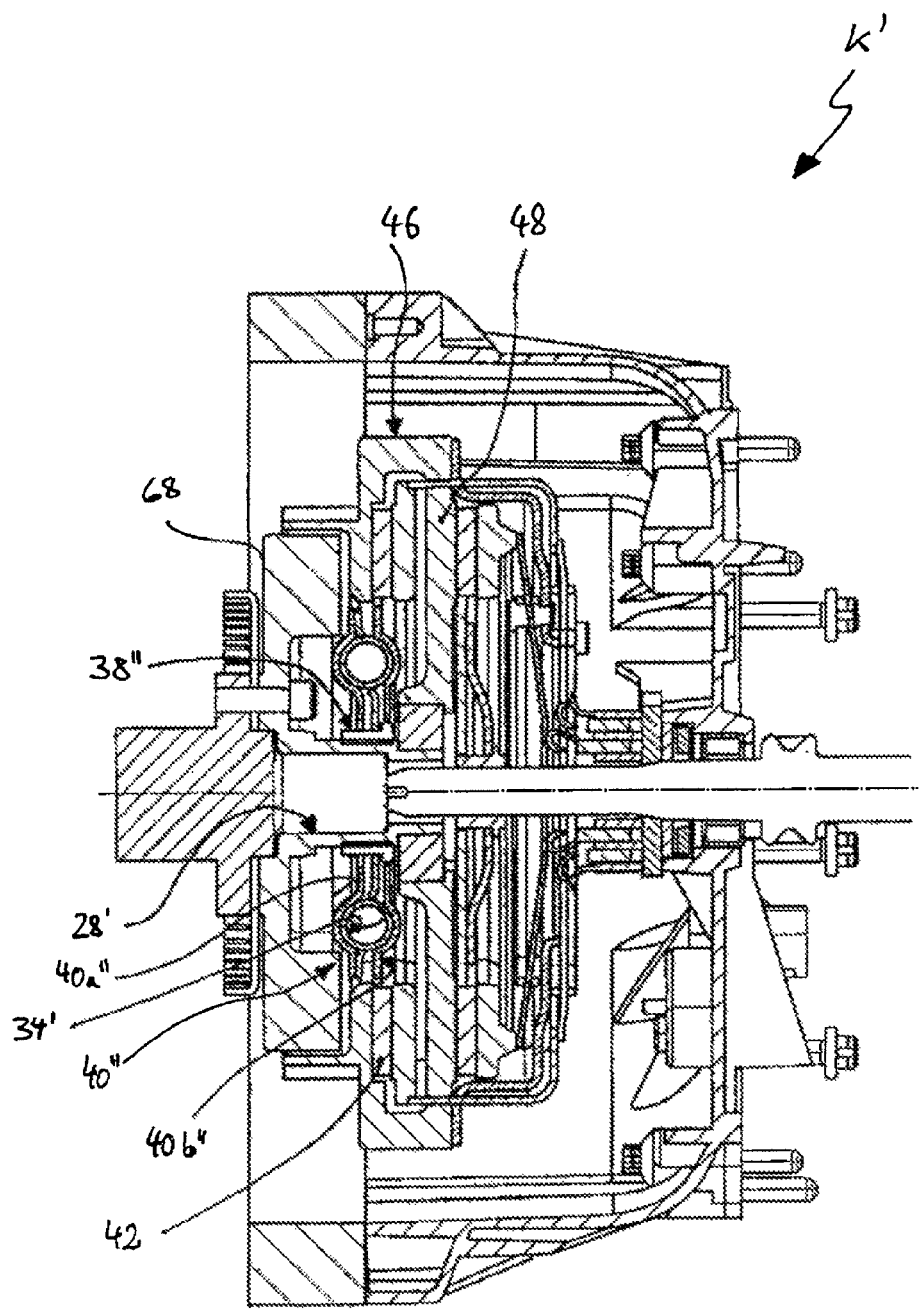
FIG. 4 illustrates a second embodiment of the clutch unit.

FIG. 4 illustrates a modified embodiment K' of the clutch module, which corresponds to a large extent to the clutch module K. However, instead of the dual-mass flywheel 32, a flywheel mass 68 is provided which, owing to its smaller outer radius in relation to the primary flywheel mass 30 as per FIG. 3, is of more massive design than the latter. The flywheel mass 68 is formed integrally with an intermediate shaft 28' which is connected rotationally conjointly to a hub 38". Instead of the clutch disk 40 of the clutch module K, a damped clutch disk 40" is provided. The clutch disk 40" comprises a primary disk 40a" and a secondary disk 40b" which are coupled to one another in a rotationally elastic manner by means of damping elements 34'.

The above-described construction exhibits substantially the same performance as the dual-mass flywheel 32. However, the components involved permit a more compact design in the radial direction, such that the flywheel mass 68 can be arranged at least partially within the carrier projection 46 of the carrier disk 48, and the clutch disk 40" can be arranged entirely within the carrier projection 46 of the carrier disk 48, in the axial direction.

The secondary disk 40b"—like the clutch disk 40 of the clutch module K—is provided with a friction lining 42. The further components of the clutch K1 and the clutch K2 and the actuator means assigned to the clutches K1, K2 are the same as the corresponding components of the clutch module K.

LIST OF REFERENCE SIGNS

10, 10' Drivetrain
12 Internal combustion engine
14 Electric motor
14a Rotor
16 Manual transmission
18 Pedal
20 Control unit
22 Cross-drive module
24 Engine output shaft
26 Transmission input shaft
28, 28' Intermediate shaft
30 Primary flywheel mass
32 Dual-mass flywheel
34, 34' Damping element
36 Secondary flywheel mass
38, 38', 38" Hub
40, 40', 40" Clutch disk
40a" Primary disk
40b" Secondary disk
42, 42' Friction lining
44, 44' Thrust plate
46 Carrier projection
48 Carrier disk
50 Bearing
52 Toothing
54, 54' Actuating lever
56, 56' Pin
58, 58' Actuating piston
60 Double central clutch operator
62 Carrier plate
64 Bearing element
66 Starter ring
68 Flywheel mass
K1, K2 Clutch
K Clutch module

What is claimed is:

1. A drivetrain of a motor vehicle, having an internal combustion engine, an electric machine, a manual transmission, and a clutch unit which extends about an axis and comprises a first clutch actuable by a driver of the motor vehicle and a second clutch automatically actuable by a control unit, wherein the electric machine can be coupled in terms of drive to the transmission unit by means of the first clutch and wherein the internal combustion engine can be coupled in terms of drive to the electric machine by means of the second clutch;

a carrier rotatable about the axis and drivingly connected the electric machine and including a carrier disk and a carrier projection axially spaced from the carrier disk; and the first clutch including a first clutch disk disposed adjacent to and in axial alignment with the carrier disk for frictionally engaging the carrier disk to connect the first clutch disk and the carrier disk, and the second clutch including a second clutch disk disposed adjacent to and in axial alignment with the carrier projection for frictionally engaging the carrier projection to connect the second clutch disk and the carrier projection.

2. The drivetrain as claimed in claim 1, wherein an axis of rotation of an output shaft of the internal combustion engine and an axis of rotation of a rotor of the electric machine are arranged offset with respect to one another in parallel.

3. The drivetrain as claimed in claim 1, wherein the first clutch and the second clutch can be actuated by means of a double central clutch operator which is arranged coaxially with respect to the clutches and which can be hydraulically or electromechanically actuated.

4. The drivetrain as claimed in claim 1, wherein the first clutch and the second clutch are dry-running clutches.

5. The drivetrain as claimed in claim 1, wherein the carrier is a functional component of the first clutch and of the second clutch.

6. The drivetrain as claimed in claim 5, wherein the carrier is mounted in an axially fixed and rotatable manner on an output shaft of the internal combustion engine or on an input shaft of the transmission unit or on a projection which is connected rotationally conjointly to the output shaft or to the input shaft.

7. The drivetrain as claimed in claim 5, wherein the carrier is permanently coupled in terms of drive to the electric machine.

8. The drivetrain as claimed in claim 7, wherein the carrier is coupled to the electric machine via a belt drive.

9. The drivetrain as claimed in claim 7, wherein a rotor of the electric machine is coupled to the carrier disk or the carrier projection.

10. The drivetrain as claimed in claim 1, wherein the carrier is arranged in an axial direction between the first clutch and the second clutch.

11. The drivetrain as claimed in claim 1, wherein the second clutch is coupled to the internal combustion engine via a torsional vibration damper, wherein a primary side of the torsional vibration damper is connected rotationally conjointly to an output shaft of the internal combustion engine, and wherein a secondary side of the torsional vibration damper is coupled rotationally conjointly to an input element of the second clutch.

12. The drivetrain as claimed in claim 11, wherein the secondary side of the torsional vibration damper and the input element of the second clutch are fastened rotationally conjointly to a hub which is mounted rotatably on the output shaft of the internal combustion engine or on a projection which is connected rotationally conjointly to the output shaft.

13. The drivetrain as claimed in claim 1, wherein a clutch disk of the second clutch has a rotationally elastic damping device in order to be able to absorb rotational vibrations generated by the internal combustion engine, wherein the clutch disk is coupled to a flywheel mass which is coupled rotationally conjointly to an output shaft of the internal combustion engine.

14. The drivetrain as claimed in claim 13, wherein the damping device is arranged radially within the carrier disk or the carrier projection.

15. The drivetrain as claimed in claim 13, wherein the flywheel mass is arranged, at least in sections, in the interior of the carrier disk or the carrier projection.

16. The drivetrain as claimed in claim 1, wherein the electric machine is a disk motor.

17. The drivetrain as claimed in claim 1, wherein the electric machine can be operated as a motor and as a generator.

18. The drivetrain of claim 1 further including a first lever disposed adjacent to the clutch disk of the first clutch and moveable for moving the clutch disk of the first clutch into frictional engagement with the clutch disk, a second lever disposed adjacent to the clutch disk of the second clutch and moveable for moving the clutch disk of the second clutch into frictional engagement with the clutch projection, and wherein the first lever is disposed at least partially in axial alignment with the second lever and radially inwardly from the second lever.

19. The drivetrain of claim 18 further including a carrier plate connected rotationally conjointly to the carrier disk, and the first lever and second lever extending through the carrier plate for preventing rotation of the first and second levers relative to rotation of the carrier plate.

20. The drivetrain of claim 19 further including a double central clutch operator having a first piston connected to the first lever for providing movement to the first lever and a second piston disposed in axial alignment with and radially inwardly from the first piston for providing movement to the second lever.

21. A drivetrain of a motor vehicle, comprising:
an internal combustion engine having an output shaft;
a manual transmission having an input shaft;
an electric machine having a rotor shaft disposed about an axis; and
a clutch unit having an input component connected to the output shaft, an output component connected to the input shaft, a carrier disposed between the input and output components and drivingly connected to the rotor shaft, the carrier including a carrier disk and a carrier projection axially spaced from the carrier disk, a first clutch actuable by a driver of the motor vehicle to couple the electric machine in terms of drive to the transmission, and a second clutch actuable by a control unit to couple the internal combustion engine in terms of drive to the electric machine;
wherein the carrier is a component of the first clutch and of the second clutch, wherein the carrier is disposed between the first clutch and the second clutch, and wherein each of the first clutch and second clutch have a clutch disk which can be pressed independently into frictional engagement with the carrier to actuate the corresponding one of the first and second clutches, and wherein the clutch disk of the first clutch is disposed adjacent to and in axial alignment with the carrier disk for frictionally engaging the carrier disk to connect the clutch disk and the carrier disk, and the clutch disk of the second clutch is disposed adjacent to and in axial alignment with the carrier projection for frictionally engaging the carrier projection to connect the clutch disk and the carrier projection.

22. The drivetrain of claim 21 wherein a drive assembly connects the carrier projection to the rotor shaft.

23. The drivetrain of claim 21 further including a first lever disposed adjacent to the clutch disk of the first clutch and moveable for moving the clutch disk of the first clutch into frictional engagement with the clutch disk, a second lever disposed adjacent to the clutch disk of the second clutch and moveable for moving the clutch disk of the second clutch into frictional engagement with the clutch projection, and wherein the first lever is disposed at least partially in axial alignment with the second lever and radially inwardly from the second lever.

24. The drivetrain of claim 23 further including a carrier plate connected rotationally conjointly to the carrier disk, and the first lever and second lever extending through the carrier plate for preventing rotation of the first and second levers relative to rotation of the carrier plate.

25. The drivetrain of claim 24 further including a double central clutch operator having a first piston connected to the first lever for providing movement to the first lever and a second piston disposed radially inwardly from the first piston for providing movement to the second lever.

\* \* \* \* \*